(12) United States Patent
Leordeanu et al.

(10) Patent No.: US 11,189,022 B2
(45) Date of Patent: Nov. 30, 2021

(54) AUTOMATIC DETECTION, COUNTING, AND MEASUREMENT OF LOGS USING A HANDHELD DEVICE

(71) Applicant: Fordaq SA, Brussels (BE)

(72) Inventors: Marius Leordeanu, Bucharest (RO); Iulia-Adriana Muntianu, Bucharest (RO); Dragos Cristian Costea, Bucharest (RO); Catalin Mutu, Drobeta-Turnu Severin (RO)

(73) Assignee: Fordaq SA, Brussels (BE)

( * ) Notice: Subject to any disclaimer, the term of this patent is extended or adjusted under 35 U.S.C. 154(b) by 30 days.

(21) Appl. No.: 16/816,075

(22) Filed: Mar. 11, 2020

(65) Prior Publication Data

US 2020/0327653 A1     Oct. 15, 2020

Related U.S. Application Data

(60) Provisional application No. 62/833,536, filed on Apr. 12, 2019.

(51) Int. Cl.
| | |
|---|---|
| *G06T 7/00* | (2017.01) |
| *G06T 7/11* | (2017.01) |
| *G06T 7/174* | (2017.01) |
| *G06T 7/194* | (2017.01) |
| *G06T 3/40* | (2006.01) |
| *G06T 3/00* | (2006.01) |

(52) U.S. Cl.
CPC ............ *G06T 7/001* (2013.01); *G06T 3/0006* (2013.01); *G06T 3/4038* (2013.01); *G06T 7/11* (2017.01); *G06T 7/174* (2017.01); *G06T 7/194* (2017.01); *G06T 2207/20084* (2013.01); *G06T 2207/30161* (2013.01); *G06T 2207/30242* (2013.01)

(58) Field of Classification Search
CPC .. G06K 9/00; G06K 9/00201; G06K 9/00671; G06K 9/00771; G06K 9/2081; G06K 9/38; G06K 9/6202; G06Q 30/0643; G06T 1/0007; G06T 11/60; G06T 2207/20084; G06T 2207/30161; G06T 2207/30172; G06T 2207/30242; G06T 3/0006; G06T 3/4038; G06T 7/001; G06T 7/11; G06T 7/174; G06T 7/194
See application file for complete search history.

(56) References Cited

U.S. PATENT DOCUMENTS

| | | | |
|---|---|---|---|
| 10,586,321 B2 * | 3/2020 | Leordeanu | ............ G06T 7/0004 |
| 10,987,822 B2 * | 4/2021 | Ursella | ...................... G06T 7/60 |
| 2018/0182088 A1 * | 6/2018 | Leordeanu | ................ G06T 7/60 |
| 2019/0003829 A1 * | 1/2019 | Kambla | .................. G01B 11/08 |

(Continued)

FOREIGN PATENT DOCUMENTS

DE     102013015833 A1     3/2015

*Primary Examiner* — Bobbak Safaipour
(74) *Attorney, Agent, or Firm* — Fenwick & West LLP

(57) ABSTRACT

A computer-based system (e.g., a handheld device) is configured to detect, count, and measure logs in a stack. A user captures one or more images of the stack. Where multiple images are captured, the system creates a working image by stitching together portions of the image. The system identifies a contour indicating the outline of the stack in the working image and fits ellipses to the log faces in the working image. Information such as the number of logs, the volume of wood in the stack, and the average log diameter may be made available for presentation to the user.

20 Claims, 8 Drawing Sheets

(56) References Cited

U.S. PATENT DOCUMENTS

2020/0193561 A1* 6/2020 Leordeanu ............ G06K 9/6273
2020/0279389 A1* 9/2020 McIver .................... G06T 7/12
2020/0327653 A1* 10/2020 Leordeanu ............ G06T 3/4038

* cited by examiner

AUTOMATIC DETECTION, COUNTING, AND MEASUREMENT OF LOGS USING A HANDHELD DEVICE

CROSS REFERENCE TO RELATED APPLICATIONS

This application claims the benefit of U.S. Provisional Application No. 62/833,536, filed Apr. 12, 2019, which is incorporated by reference.

BACKGROUND

Technical Field

The disclosure relates generally to inventory management, and in particular to automatically counting and measuring logs using images captured using a handheld device.

Background Information

After felling, trees are typically roughly cut into logs and stored in stacks before being cut into lumber at a sawmill or other processing facility. These log stacks are often in remote locations with limited access to hi-tech equipment for determining and tracking the inventory available at any given location. Handheld devices with cameras are now commonly available and relatively low-cost. For example, many people now carry smartphones that include a camera. However, images captured using such devices are susceptible to variations that make automated analysis difficult.

The technical challenges in automatically counting logs using images captured with mobile devices are numerous. There may be variations in illumination, viewpoint, scale (distance between camera and log stack), log size, log shape, and log texture, as well as blurring, shadows, distractors (e.g., marks written on logs), and other irregularities in appearance and structure. The processing power of many mobile devices is also limited, making complex analysis impractical. Furthermore, internet bandwidth may be limited or nonexistent at the locations of log stacks, making cloud-based processing impractical.

Some existing approaches use simple models to estimate the amount of wood in a log stack from a photograph. For example, by assuming that all logs are perfect cylinders, the calculation of volume is made simpler. However, such approaches may lead to large errors, making them impractical. Furthermore, such approaches may not adequately handle other irregularities, such as distractors, shadows, blurring, and the like.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures. The figures and the following description are provided by way of illustration only. One skilled in the art will readily recognize from the following discussion that alternative embodiments of the structures and methods disclosed herein are viable alternatives that may be employed without departing from the principles of what is described. Wherever practicable similar or like reference numbers may be used in the figures and may indicate similar or like functionality.

Configuration Overview

In various embodiments, a computer-based system (e.g., a handheld device) is configured to detect, count, and measure logs in a stack. A user captures one or more images of the stack. Where multiple images are captured, the system creates a working image by stitching together portions of the image. The system identifies a contour indicating the outline of the stack in the working image and fits ellipses to the log faces in the working image. Information such as the number of logs, the volume of wood in the stack, and the average log diameter may be made available for presentation to the user.

In one embodiment, the system includes an image stitching subsystem that creates the working image and a contour detection subsystem that detects the log stack in the working image and defines a contour surrounding the log stack. The system also includes a log detection subsystem that crop the working image based on the contour and fits ellipses to log faces in the working image as well as a results generation subsystem that generates results for display based on the fitted ellipses.

In another embodiment, the system includes a processor coupled to a memory. The memory includes instructions that when executed by the processor cause the processor to receive images of a stack of logs and generate a stack segmentation map indicating wood and background pixels for each image. Log and center segmentation maps are generated for each image. The log segmentation maps indicate regions of the image depicting log faces and the center segmentation maps indicate locations of log centers in the image. The instructions also cause the processor to stitch portions of the images together based on logs and center segmentation maps to form a working image and analyze the working image to generate information regarding logs in the log stack.

Figure 1:
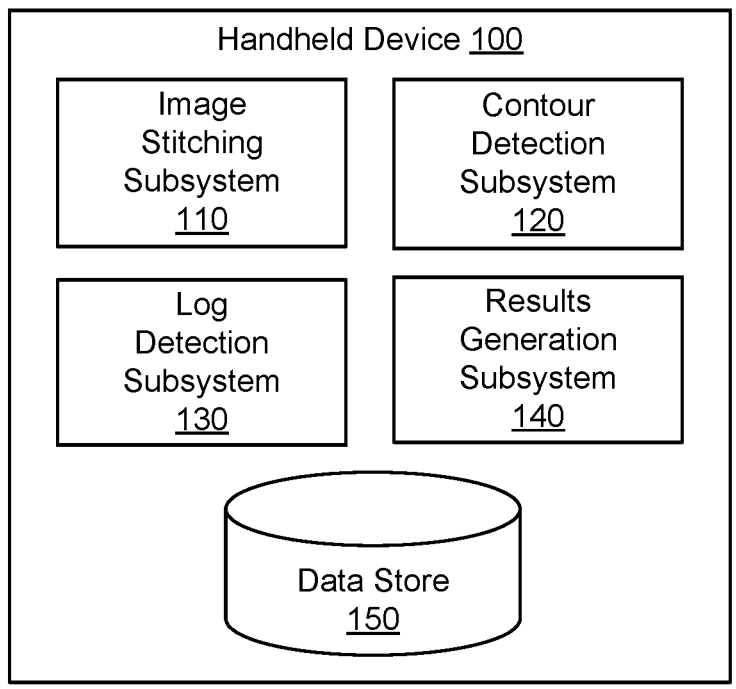
FIG. 1 is a block diagram of a handheld device for detecting, counting, and measuring logs, according to one embodiment.

FIG. 1 illustrates an example embodiment of a handheld device 100 configured to detect, count, and/or measure logs in a stack. In the embodiment shown, the handheld device 100 includes an image stitching subsystem 110, a contour detection subsystem 120, a log detection subsystem, a results generation subsystem 140, and a data store 150. In other embodiments, the handheld device 100 contains different and/or additional elements. In addition, the functions may be distributed among the elements in a different manner than described. For example, in a configuration where logs are counted in a single image, the image stitching subsystem 110 may be omitted.

The image stitching subsystem 110 takes a set of images provided by a user (e.g., captured using a camera integrated with or connected to the handheld device 100) and generates a working image of a log stack from the set of images. At least one of the images may include a reference object of known dimensions (e.g., a one meter stick with cross pieces on each end to aid identification in the final image). The reference object enables the handheld device 100 to convert image coordinates into physical dimensions. In one embodiment, the working image is composed of transformed subsections of the original images stitched together to form a panorama. For example, each image may be transformed such that the image plane is substantially parallel to the depicted log faces (meaning the cut, approximately elliptical ends of the logs in the stack). The working image may be generated such that the data used to generate the depiction of each log face is taken from a single image in the set. Various embodiments of the image stitching subsystem are described in greater detail below, with reference to FIG. 2.

The contour detection subsystem 120 analyzes a working image (either a single image or a stitched image) and generates a contour indicating the outline of a depicted log stack. If the working image depicts more than one log stack, the contour detection subsystem 120 may assume that the largest one is of interest to the user or may prompt the user to select between the detected log stacks. In one embodiment, the contour detection subsystem 120 automatically defines the contour using a set of points surrounding the depiction of the log stack in the working image. The contour detection subsystem 120 may start with a large number of points, defining a precise contour, and prune the points to select a subset that define a contour that contains all of the wood pixels in the log stack and no more than a predefined maximum amount of background pixels. The contour detection subsystem 120 may provide an interface for the user to move some or all of the points, thus redefining the contour. Various embodiments of the contour detection subsystem 120 are described in greater detail below, with reference to FIG. 3.

The log detection subsystem 130 identifies logs in the portion of the working image corresponding to the log stack (e.g., as defined by the contour generated by the contour detection subsystem 120). The log detection subsystem 130 determines a set of ellipses corresponding to log faces. Each ellipse may indicate the approximate outline of a log face in the working image. In one embodiment, the log detection subsystem 130 automatically maps ellipses to portions of the working image. The log detection subsystem 130 may also provide an interface for the user to edit, remove, or add ellipses. Various embodiments of the contour detection subsystem 120 are described in greater detail below, with reference to FIG. 4.

The results generation subsystem 140 generates a user interface that presents information to the user based on the identified logs. The information may include an estimated volume of wood in the stack, the number of logs, an estimated volume fill factor, an average size of the logs, and/or the like. The user interface may provide additional information such as the location of the stack (e.g., GPS coordinates), the type of wood, whether the bark has been removed from the logs, etc. The user interface may also include the working image, which may be annotated with the contour and/or ellipses generated by the contour detection subsystem 120 and log detection subsystem 130, respectively. Various exemplary user interface for presenting results are described in greater detail below, with reference to FIG. 5.

The data store 150 includes one or more computer-readable media configured to store data used by the handheld device. In one embodiment, the data store 150 stores raw images captured by a camera, working images generated by the image stitching subsystem 110, annotated images including contours and/or ellipses generated by the contour and log detection subsystems 120, 130, reports generated by the results generated by the results generation subsystem 140, and/or the like. Although the data store 150 is shown as a single entity located within the handheld device 100, the data may be stored across multiple computer-readable media. Furthermore, some or all of the data may be stored remotely (e.g., in a distributed database) and accessed via a network (e.g., the internet).

Example Image Stitching Subsystem

Figure 2:
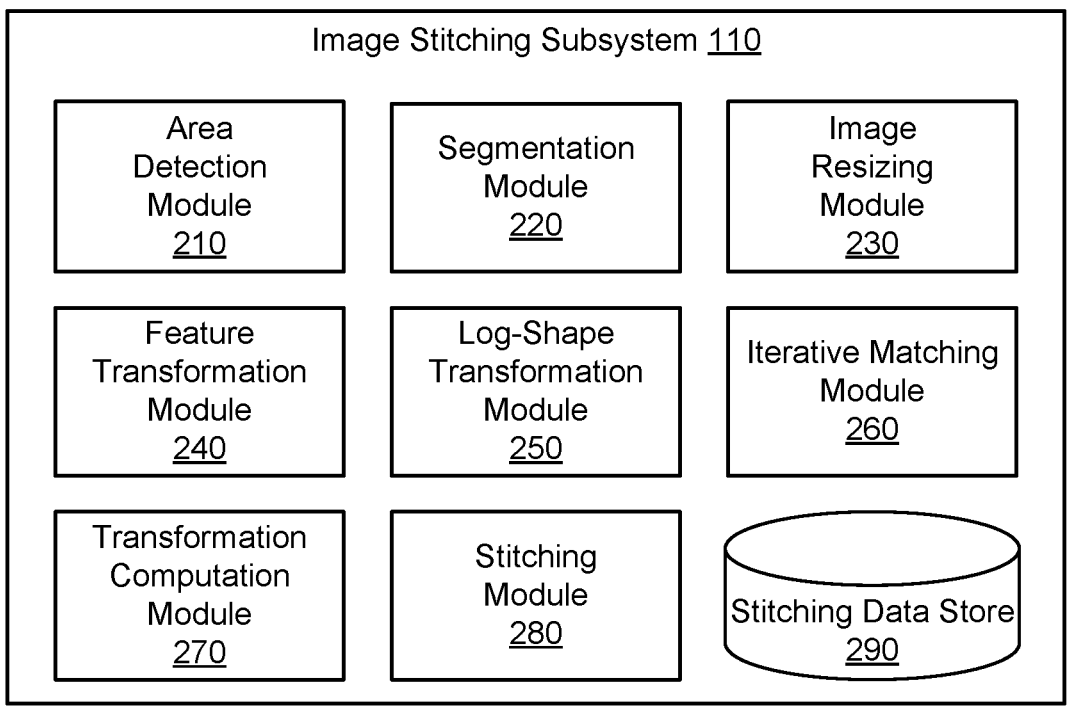
FIG. 2 is a block diagram of the image stitching subsystem of FIG. 1, according to one embodiment.

FIG. 2 illustrates an example embodiment of the of the image stitching subsystem 110. In the embodiment shown, the image stitching subsystem 110 includes an area detection module 210, a segmentation module 220, an image resizing module 230, a feature transformation module 240, a log-shape transformation module 250, an iterative center matching module 260, a transformation computation module 270, a stitching module 280, and a stitching data store 290. The modules of the image stitching subsystem 110 process a set of input images (e.g., captured by a camera of the handheld device 100) to create a working image from portions of the images. In other embodiments, the image stitching subsystem 110 contains different and/or additional elements. In addition, the functions may be distributed among the elements in a different manner than described.

The area detection module 210 identifies areas in the input images that correspond to wood. In one embodiment, the area detection module 210 uses a neural network that generates a binary segmentation map of an input image in which pixels are identified as either wood or background (e.g., non-wood). The image may be resized to have a maximum width and/or height (e.g., 512 pixels) and then split into patches of predetermined size (e.g., 256 by 256 pixels). The patches are provided as input to the neural network, which is trained to generate a likelihood that each pixel in an inputted patch corresponds to wood. A segmentation map for is built for the input image by stitching the patches back together, resizing the resulting image back to the size of the original input image. The segmentation map may be binarized by applying a likelihood threshold. In other words, any pixel for which the likelihood exceeds the threshold is considered wood and is one color (e.g., black) while the remaining pixels are considered background and are another color (e.g., white).

The segmentation module 220 uses a trained segmentation model (e.g., a neural networks) to generate a log segmentation map and a center segmentation map for each input image. A log segmentation map indicates regions of an image the model predicts depict the face of a log while a center segmentation map indicates smaller regions the model predicts correspond to the center of log faces. The input images may be cropped based on the binary segmentation map to reduce the number of background (i.e., non-wood) pixels. A predetermined point (e.g., the top-left crop corner) may be retained so that the original image can be reconstructed. Cropping the input images may result in significantly better results than applying the neural network to entire images.

In one embodiment, a logs and centers neural network is trained using training data generated by a human operator annotating images of log stacks with ellipses corresponding to log faces in the images. A binary log map is created by eroding the human-annotated ellipses by a predetermined amount (e.g., 9%) along the major and minor axes of the ellipses. Alternatively, the human-annotated ellipses may be used as the binary log map without erosion. A binary center map is created by eroding the human-annotated ellipses by another predetermined amount (e.g., 50%) along the major and minor axes. Note that the only difference between the log and center maps (in this embodiment) is the degree of erosion. Thus, a training image may include: a 3-channel RGB cropped image depicting a log stack, a 1-channel binary log map, and a 1-channel binary center map. In some embodiments, erosion ranges between five and fifteen percent are used, but in other embodiments, other percentages my be used.

Each training image is split into patches of a predetermined size (e.g., 1024×1024 pixels) and provided as input to the neural network. The neural network generates a log map and center map from the three channels corresponding to the input image and computes an error value by comparing the generated maps to those derived from the human-annotated ellipses. The error value indicates a degree of differences between the generated maps and those derived from the human-annotated ellipses. The neural network is updated (e.g., via backpropagation) to reduce the error value. Thus, over multiple iterations using multiple training images, the neural network is trained to generate log and center maps that match those that are (or would be) derived from human-annotated ellipses.

The trained neural network may be fine-tuned for mobile device usage. One approach for this is to resize each cropped image at runtime to a maximum width and/or height (e.g., 1024 pixels) and then split it into patches of a predetermined size (e.g., 512×512 pixels). Thus, accuracy can be substantially maintained while enabling the network to be applied by a mobile device without excessive processing times.

In one embodiment, the neural network generates a 2-channel output for each patch. One channel is a log segmentation map for the patch and the other channel is a center segmentation map for the patch. Alternatively, the segmentation maps may be output as separate data objects. The outputted maps for the patches generated from an input image may be stitched together to form aggregated log and center segmentation maps for the input image. The aggregated segmentation maps may be resized to the cropped image size and binarized using a likelihood threshold in a similar manner as described previously with reference to the segmentation map generated by the area detection module 210. Each cropped segmentation map may be translated to the original image coordinate system by using a retained pre-determined point (e.g., the top-left crop corner coordinates).

The image resizing module 230 resizes input images based on the output from the area detection module 210 and/or segmentation module 220. In one embodiment, the image resizing module 430 resizes an input image relative to other images in the set. In particular, the image is resized to reduce the difference between stack height and/or median log dimensions. For example, a difference metric between two images may be calculated by summing the square of the differences between maximum stack height and median log dimensions. An image may be resized to minimize the sum of the difference metrics between that image and each other image in the set. Resizing the images may improve feature detection and matching by providing features that are similar in size. The precise techniques used for resizing may vary according to the specific training used and requirements of the use case.

The feature transformation module 240 computes transforms to apply to input images. In one embodiment, feature transformation module 240 detects feature lists for each image using a feature detection algorithm (e.g., a fine-tuned SURF detector). Features may be detected only for the area of an image that corresponds to a wood stack (e.g., as identified by the areas detection module 210). Alternatively, features may be detected for the whole image and then the detected features can be filtered to remove those outside of the area corresponding to the wood stack.

The feature transformation module 240 matches consecutive images in the set based on the determined feature lists and identifies matching features to determine how one image maps to the other. In one embodiment, the feature transformation module 240 computes the homographic transforms from one image in a matched pair to the other based using a RANSAC inlier selection algorithm. The resulting homographic transform can be combined with a rigid transform on the same set of matching features using a dynamically determined composition factor. The composition factor may be computed based on a validation technique against real panorama images. During training, for each set of images that are transformed and in order to build the final panorama image, a picture that depicts the entire stack of logs may also be captured. The composition factors can be validated by comparing the detected logs inside the stitched panorama with the logs detected on the full stack image, using various error measuring techniques, such as: centers displacement, ellipse size, or intersection over union. Moreover, the validation may be reiterated for subsets of panorama image sets, split by number of images, image size, or number of logs in the image. The feature transformation module 240 may also determine an image mask for each image based on the matches and determined transforms. The image mask for an image indicates its position and shape within the panorama.

The feature transformation module 240 applies the transformations to the resized images as well as the corresponding log and center segmentation maps. If image masks are used, the transformations are also applied to the image masks. In one embodiment, the feature transformation module 240 determines the amounts by which consecutive images overlap (e.g., an intersection over union percentage). If the overlap between a pair of images is over a threshold (e.g., the intersection over union percentage exceeds 40%), one of the images is discarded. For example, for 3 consecutive images x, x+1 and x+2, the feature transformation module 240 determines the overlap percentage between image x and image x+2. If the percentage is over the 40% threshold, given that the central image is the same size as the other two, image x+1 can be discarded as it offers no extra relevant information for the stitching; all of its content will be included in x and in x+2. If the image set size is reduced by discarding one or more images, the matches between consecutive images are recalculated. Reducing the amount of overlap between the input images may improve the stitch accuracy of the resulting panorama.

The log-shape transformation module 250 takes the transformed log segmentation maps as input and identifies ellipses that likely correspond to log ends in each image. In one embodiment, the log-shape transformation module 250 finds connected components in the log segmentation maps. The connected components may be pruned to remove those that are unlikely to correspond to a log face (e.g., connected components with a total area below a minimum size threshold, a total area above a maximum size threshold, or a difference between major and minor axes greater than an aspect ratio threshold, etc.).

The log-shape transformation module 250 fits ellipses on the identified connected components. Assuming the ellipse set is statistically significant (e.g., more than a threshold number of percentage of connected-components are fitted with an ellipse), the log-shape transformation module 250 computes an affine transformation matrix that transforms the ellipse coordinates to circle coordinates (e.g., using a RANSAC inliers selection algorithm). For log stacks with large numbers of logs, the median log shape is generally close to a circle so this transformation provides an approximation of how the log stack would appear if the image plane were perpendicular to the log faces. The log-shape transformation module 250 composes an updated transform from the homographic and rigid transform computed previously and the affine transform based on the ellipses (e.g., using a dynamically determined composition factor).

The iterative matching module 260 determines the degree to which the updated transform result in the overlapping parts of images matching. If the degree to which consecutive images match does not meet a threshold, the iterative matching module 260 causes the feature transformation module 240 and/or the log-shape transformation module 250 to update the determined transforms. This process may be repeated until the degree of match meets the threshold or some other end condition is met (e.g., a maximum number of iterations is reached). In one embodiment, the iterative matching module 260 analyzes the transformed center maps to match log centers in consecutive images based on displacement and size and adds matches to a matches list. The iterative matching module 260 may computes the degree of similarity for a pair of images based on the proportion of log centers in the overlapping portions of the pair of images that are included in the match list. In one embodiment, the transform is considered sufficient to proceed when the centroids determined after the transform x+1 are highly similar (e.g., within a threshold distance in pixel coordinates) to centroids determined after transform x. The centroids may be validated using displacement and size metrics.

The output from the iterative matching module 260 includes a set of transforms that map each pair of consecutive images to depict the log stack from matching perspectives. The transformation computation module 270 uses the set of transforms to calculate a final transform for each image such that the whole set of images are mapped to substantially the same perspective. Note that the term "final transform" is used for convenience, but in some embodiments, additional transforms may be applied after the final transform. In one embodiment, the central image in the set is used as a panorama pivot. The transformation computation module 270 computes a transform for each image that that will translate, rotate, and/or change its perspective to match the 2D plane of the central image. If there is an even number of images, either the left or right center image may be used as the panorama pivot (e.g., with four images, either the second or third image may be used).

The stitching module 280 applies the final transforms computed by the transformation computation module 270 and determines the intersection area between each consecutive pair of images. The stitching module 280 identifies stitch lines in the overlapping portions of consecutive images and generates a panoramic working image by stitching together the images along the stitch line. The stitching may begin from the pivot image and work outwards. In one embodiment, the stitching module 280 computes log intersections between each pair of images based on the transformed log maps. Inside an intersection area, the stitching module 280 determines the maximum energy path through the overlapping portion (e.g., from the top to the bottom) that surrounds the log faces inside the image without cutting through any log faces. The stitching module 280 crops each image in the pair along the maximum energy path and stitches the remaining portions together. Thus, the depiction of individual log faces in the working image are constructed from a single input image rather than constructed from two images. This process is repeated until the set of images have been cropped and stitched into the panoramic working image.

The stitching data store 290 includes one or more machine-readable media configured to store data used by the image stitching subsystem 110. For example, the input images, segmentation models, segmentation maps, transformed images, and/or stitched panoramic images may be stored in the stitching data store 290. Although the stitching data store 290 is shown as a single entity within the image stitching subsystem 110, some or all of the data may be stored elsewhere (e.g., in data store 150). Furthermore, the data may be distributed across multiple storage devices (e.g., as part of a distributed database accessed via a network).

Example Contour Detection Subsystem

Figure 3:
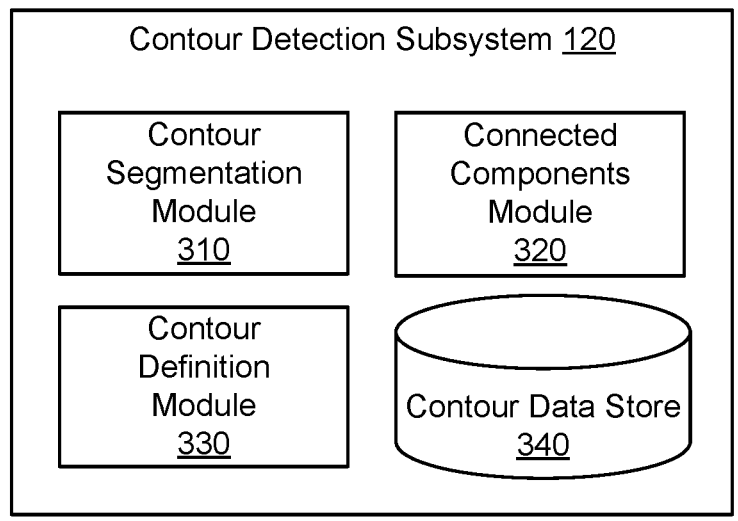
FIG. 3 is a block diagram of the contour detection subsystem of FIG. 1, according to one embodiment.

FIG. 3 illustrates an example embodiment of the contour detection subsystem 120. In the embodiment shown, the contour detection subsystem 120 includes a contour segmentation module 310, a connected components module 320, a contour definition module 330, and a contour data store 340. The modules of the contour detection subsystem 120 process a working image (either a single image or a stitched panorama) and generate a contour indicating the outline of a log stack depicted in the working image. In other embodiments, the contour detection subsystem 120 contains different and/or additional elements. In addition, the functions may be distributed among the elements in a different manner than described.

The contour segmentation module 310 takes a working image (e.g., as generated by image stitching subsystem 110) and generates a segmentation map indicating pixels that correspond to wood. In one embodiment, the contour segmentation module 310 generates the segmentation map using a neural network in a similar manner to the area detection module 210. The structure of the neural network may be the same as the one used by the area detection module 210 but it may be configured to take larger patches as input. For example, the working image may be divided into 512 by 512 pixel patches. Using larger patches generally improves the precision of the segmentation map which may result in more accurate contours.

The connected components module 320 identifies connected components in the segmentation map generated by the contour segmentation module 310. A connected component is a contiguous group of pixels that correspond to wood (e.g., for which a path can be drawn from any pixel in the group to any other making only steps from a current pixel to an adjacent pixel without crossing any pixels that do not correspond to wood). If the segmentation map of the working image contains more than one connected component (e.g., multiple stacks), the connected components module 320 may automatically select the largest one. Alternatively, the user may be prompted to select which connected component is of interest (e.g., by displaying the image with the connected components highlighted and prompting the user to click or tap on the one that is of interest).

The contour definition module 330 defines a contour indicating the outline of the log stack based on the selected connected component. In one embodiment, the contour is defined by a set of contour points surrounding the wood stack in the working image, with the contour being completed by straight lines connecting adjacent contour points. The connected component may be fine-tuned so that the contour points highlight the local minimum and maximum values. For example, the contour definition module 330 may detect the contour as a precise list of points that surround the log area and then prune the list based on a refinement that selects the minimum list of points that define a contour containing all the wood pixels in the log segmentation map and no more than a maximum amount of non-wood pixels. The user may be presented with the possibility to edit the contour points through the application interface (e.g., by dragging one or more points to a different position). The user may additionally be able to add additional contour points and/or delete contour points (e.g., by pressing and holding at a location to add point and pressing and holding on an existing contour point to delete it).

The contour data store 340 includes one or more machine-readable media configured to store data used by the contour detection subsystem 120. For example, copies of the working image, the segmentation models, segmentation maps, and/or metadata indicating the locations of contour points may be stored in the contour data store 340. Although the contour data store 340 is shown as a single entity within the contour detection subsystem 120, some or all of the data may be stored elsewhere (e.g., in data store 150). Furthermore, the data may be distributed across multiple storage devices (e.g., as part of a distributed database accessed via a network).

Example Log Detection Subsystem

Figure 4:
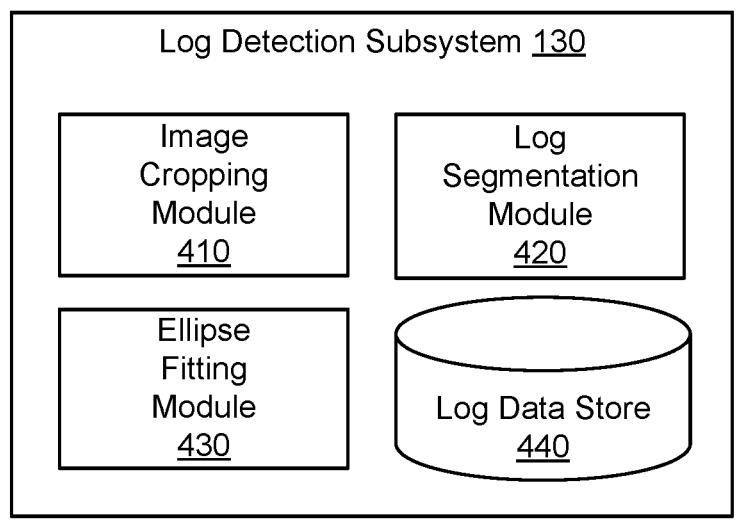
FIG. 4 is a block diagram of the log detection subsystem of FIG. 1, according to one embodiment.

FIG. 4 illustrates an example embodiment of the log detection subsystem 130. In the embodiment shown, the log detection subsystem 130 includes an image cropping module 410, a log segmentation module 420, an ellipse fitting module 430, and a log data store 440. The modules of the log detection subsystem 130 identifies log faces in the portion of the working image corresponding to the log stack (e.g., the area inside a contour generated by the contour detection subsystem 120). In other embodiments, the log detection subsystem 130 contains different and/or additional elements. In addition, the functions may be distributed among the elements in a different manner than described.

The image cropping module 410 crops the working image to remove some of the background and focus the following analysis on the wood stack. In one embodiment, the image is cropped between the minimum and maximum 2D coordinates of contour. Thus, the log stack extends from the bottom to the top of the cropped working image. The top-left crop point may be stored (e.g., in the log data store 440) to enable reconstruction of the original image for displaying the results to the user.

The log segmentation module 420 generates log and center segmentation maps from the cropped working image in a similar manner to the segmentation module 220 of the image stitching subsystem 110. In one embodiment, the log segmentation module 420 uses a neural network trained in a similar manner as described previously with reference to the image stitching subsystem 110. However, the neural network used by the log segmentation module 420 may be configured for larger input patches (e.g., 768 by 768 pixels, 1024 by 1024 pixels, etc.), which can lead to greater precision in the generated logs and center segmentation maps than those generated by the image stitching subsystem 110 at the cost of greater processing power and/or time requirements.

The ellipse fitting module 430 fits ellipses to log faces in the working images based on the logs and center segmentation maps generated by the log segmentation module 420. In one example embodiment, the ellipse fitting module 430 generates a list of log centers in the image by identifying connected components in the center segmentation map. The ellipse fitting module 430 fits ellipses over the connected components (e.g., using a least-square fitting of the connected component outline). Because the neural network is trained to generate the center segmentation map using training data where log face outlines have been eroded by a relatively large amount (e.g., 50%), the list of centers includes relatively small ellipses that are generally located within a larger log face (and approximately in the center of a log face unless the particular center is a false positive).

The ellipse fitting module 430 determines an initial list of log face ellipses by comparing the list of centers with the log segmentation map. The initial list includes connected components in the log segmentation map that can be clearly distinguished as a single log face without further processing. In one embodiment, connected components in the log segmentation map are included in the initial list if they fulfill the following criteria: (1) the connected component contains only one point from the centers list; (2) the center contained within the connected component is positioned closely to the connected component center (e.g., the center is inside the detected log and the displacement between the center point and the log center is smaller than half of the detected log major axis); (3) the area of the connected component is larger than 10% of the median connected component area; and (4) the ratio between the major and minor axes of the ellipse fitted over the connected component is in a predetermined range (e.g., between 0.3 and 3).

The ellipse fitting module 430 dynamically determines the average major and minor dilation percentage that maps log centers to the corresponding ellipses in the initial list and removes those centers from the center segmentation map. An updated centers list is generated from the remaining connected components in the center map. The ellipse fitting module 430 dilates remaining centers with the dynamically determined major and minor dilation percentages. The dilated centers are added to the initial list of ellipses, thus obtaining an enriched set of ellipses that includes the ellipses identified from the log segmentation map and the ellipses obtained by dilating centers from the center segmentation map.

The ellipse fitting module 430 removes the ellipses in the enriched ellipse list from the log segmentation map and then analyzes the log updated segmentation map to identify any ellipses that were not included in the enriched ellipse list. Any such ellipses are added to the enriched list. The ellipse fitting module 430 may prune the enriched list based on area and overlap percentages. For example, any ellipses with an area outside of an expected range (e.g., larger than ten percent of the median connected component area), with a center outside of the contour generated by the contour detection subsystem 120, and/or that overlap with other ellipses by more than a threshold amount (e.g., forty percent) may be removed from the enriched ellipse list. The ellipse fitting module 430 may also perform a final fitting procedure to better fit the ellipses to the corresponding log faces in the working image. For example, the final fitting may involve a dilation of the detected ellipses to compensate for the erosion percentage in the training phase. The final fitting may also involve verifying that the ellipse is not placed outside of the initial contour by testing its center position relative to the contour.

The output from the ellipse fitting module 430 is a set of ellipses indicating the location and size of log faces in the working image. The set of ellipses may be stored (e.g., in the log data store 440) as an ellipse segmentation map, a set of center coordinates along with corresponding major axes, minor axes, and orientations, or in any other suitable manner. One of skill in the art will recognize various modifications to the described approach for fitting ellipses to the working image are possible.

The log data store 440 includes one or more machine-readable media configured to store data used by the log detection subsystem 130. For example, copies of the working image, the segmentation models, segmentation maps, and/or metadata indicating the locations of ellipses may be stored in the log data store 440. Although the contour data store 440 is shown as a single entity within the log detection subsystem 130, some or all of the data may be stored elsewhere (e.g., in data store 150). Furthermore, the data may be distributed across multiple storage devices (e.g., as part of a distributed database accessed via a network).

Example User Interface

Figure 5:
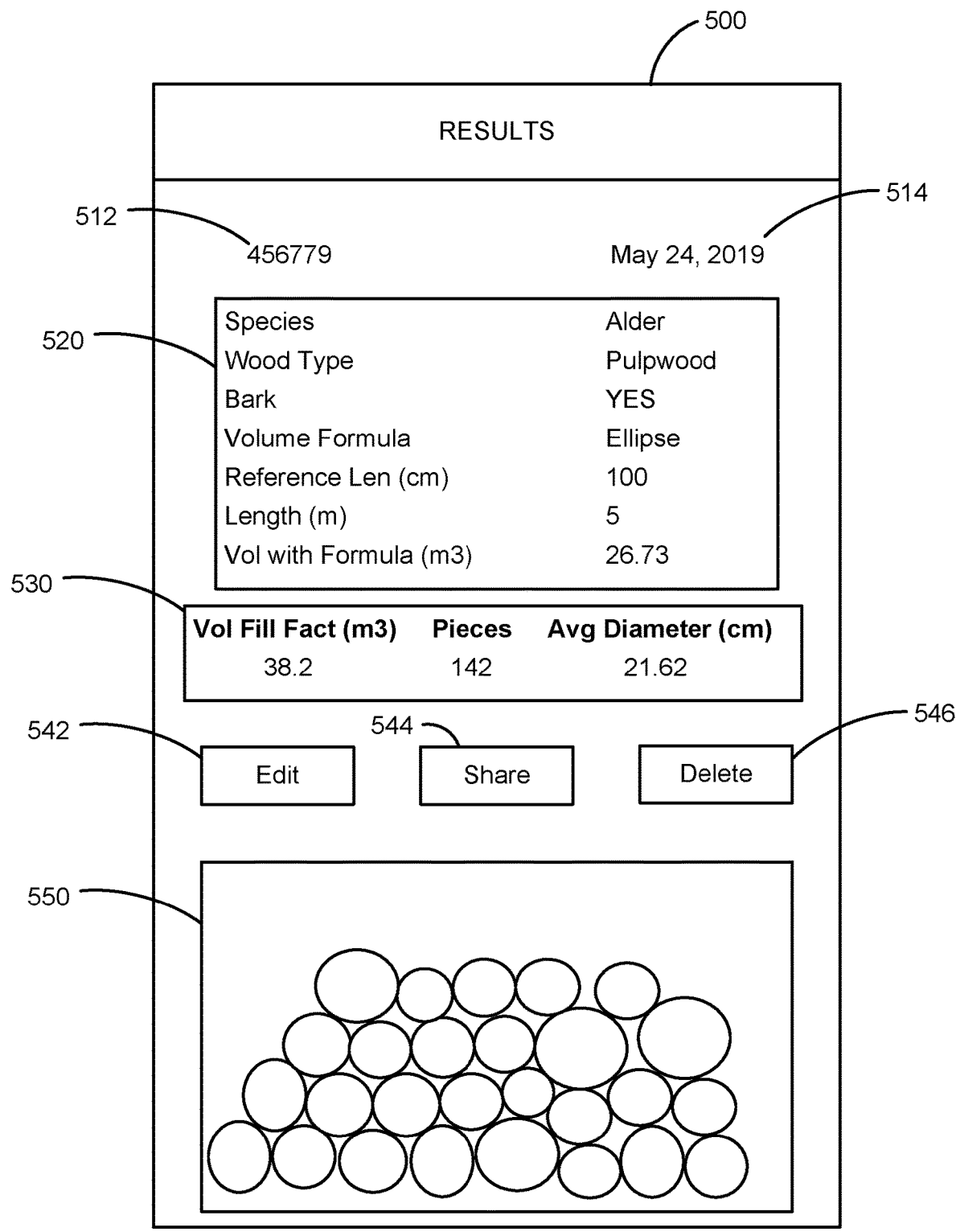
FIG. 5 illustrates an example user interface generated by the results generation subsystem of FIG. 1, according to one embodiment.

FIG. 5 illustrates an example user interface 500 for presenting results to a user (e.g., as generated by the results generation subsystem 140), according to one embodiment. In the embodiment shown, the user interface 500 includes a result identifier 512, a date 514, log stack information 520, log stack statistics 530, and an image of the log stack 550. The user interface 500 also includes a set of controls (in this case, an edit button 542, a share button 544, and a delete button 546). The example user interface 500 is configured for display on a mobile device such as a smartphone. Mobile devices typically have relatively small screens and are used in portrait orientation. The layout shown efficiently conveys information to the user on such a screen. However, in other embodiments, the user interface 500 may have other layouts. Furthermore, the user interface 500 may include different and/or additional elements.

The result identifier 512 identifies the particular result currently being displayed in the user interface. In one embodiment, the result generation subsystem 140 assigns each result a unique number when it is generated (e.g., using a consecutive numbering system). Thus, the results may be stored in a database (e.g., within the data store 150) and indexed by the result identifiers 512. The result generation subsystem 140 may use other formats, such as alphanumeric result identifiers 512.

The date 514 indicates the date on which the results being displayed were generated.

The log stack information 520 provides information about the log stack. Some of the information may be provided by the user. For example, in one embodiment, when capturing the image or images of the log stack, the handheld device 100 may prompt the user to provide information such as the species of tree, type of wood, and whether the logs still have bark on. The user may also be prompted for information used in the calculations, such as selecting a volume equation to use (in this case, the ellipse equation was selected), the length of the reference object used, and the length of the logs in the stack. The results generation subsystem 140 calculates the total volume of wood in the stack based on the provided information and the output from the log detection subsystem 130 and includes it on the log stack information 520.

The log stack statistics 530 provide additional information about the log stack derived from the information provided by the user and the output from the log detection subsystem 130. In the embodiment shown in FIG. 5, the log stack statistics 520 include the volume fill factor of the stack, the number of logs in the stack, and the average diameter of the logs. In other embodiments, different or additional information may be provided as part of the log stack information 520 and/or log stack statistics 530.

The image of the log stack 550 may be the working image and/or the individual images used to generate the working image. In some embodiments, the log stack image 550 may include one or more overlays indicating the contour, center segmentation maps, log segmentation maps, and/or the set of ellipses output by the log detection subsystem 130. For example, the user may be provided with controls (not shown) to toggle each overlay on or off.

The edit button 542 enables the user to edit some or all of the information used to generate the results. In one embodiment, on selecting the edit button 542, the user is provided with an interface to edit the contour and/or output set of ellipses as well as edit the user-provided information such as the type of wood, length of the logs, and volume formula to be used. For example, the contour points might be displayed on the log stack image 550 and the user may drag one or more of the contour points to better define the outline of the stack. When information is edited, the results generation subsystem 140 recalculates the results and updates the user interface 500 accordingly.

The share button 544 enables the user to share the currently displayed results (e.g., via email, instant messaging, social media, or the like). The delete button 546 enables the user to delete the currently displayed results. Generally, the user will be prompted to confirm their intention to delete results to reduce the likelihood of accidental deletion, but this is not required.

Example Methods

FIGS. 6 through 9 illustrate various example methods that may be performed by the handheld device 100 in detecting, counting, and/or measuring logs in a stack. The steps illustrated are described from the perspective of various components of the handheld device 100 performing the methods. However, some or all of the steps may be performed by other entities and/or components. In addition, some embodiments may perform the steps in parallel, perform the steps in different orders, or perform different steps.

Figure 6:
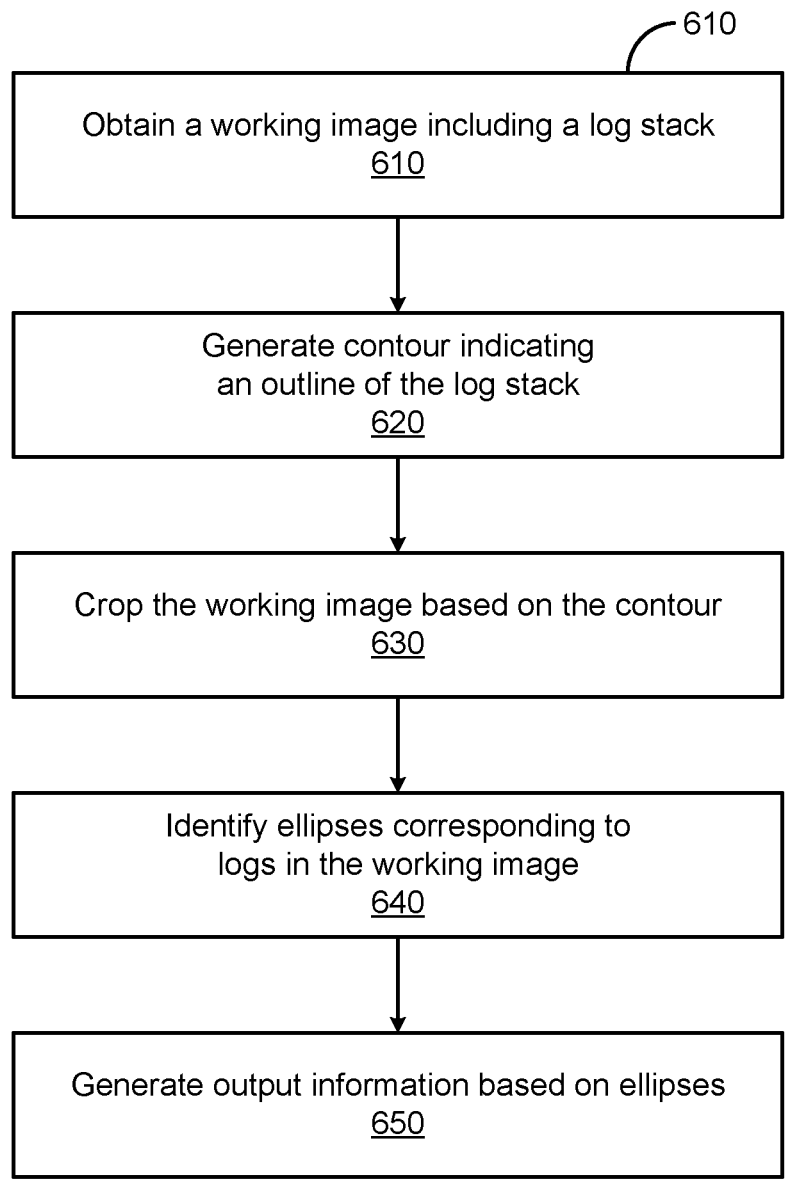
FIG. 6 is a flowchart illustrating an example method for detecting, counting, and measuring logs, according to one embodiment.
Figure 7:
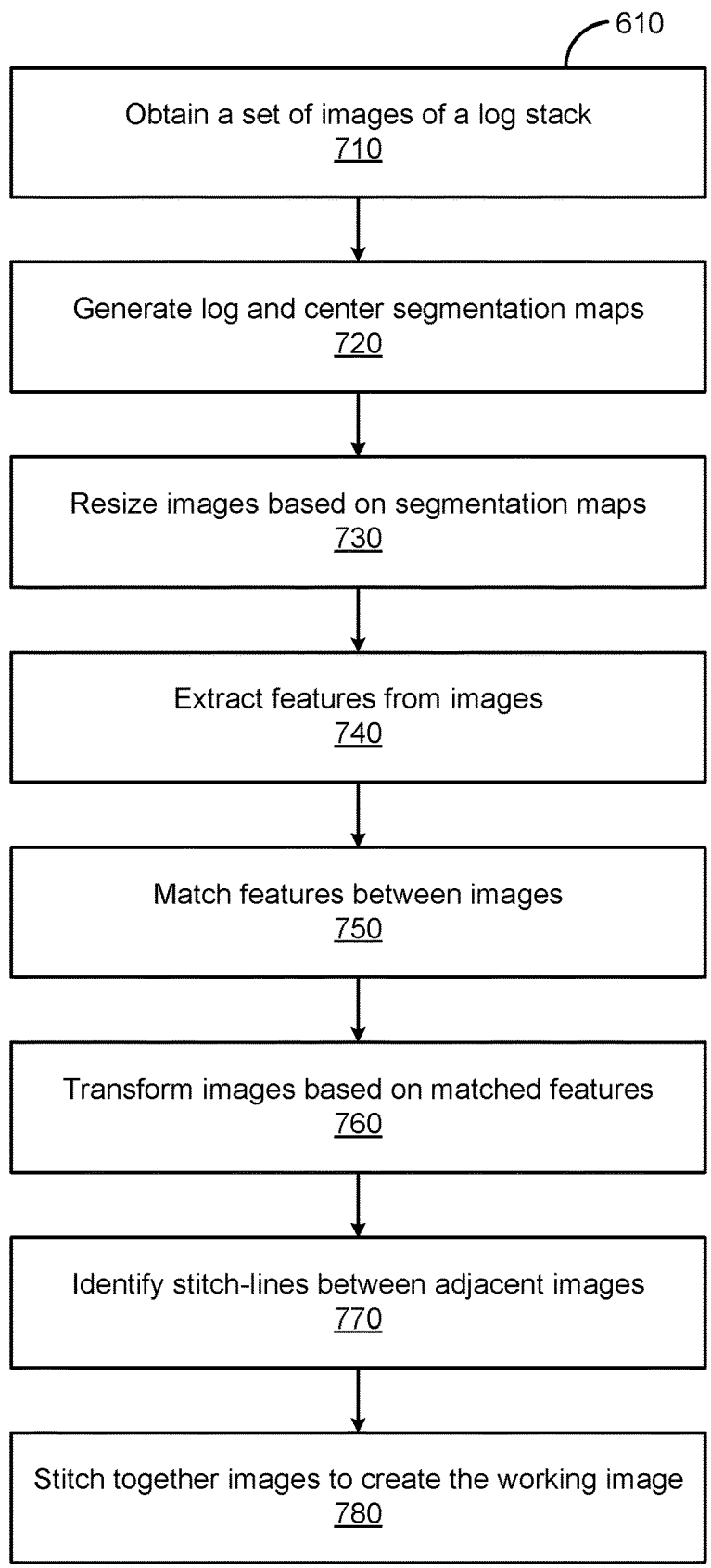
FIG. 7 is a flowchart illustrating an example method for stitching a set of images to generate a working image, according to one embodiment.
Figure 8:
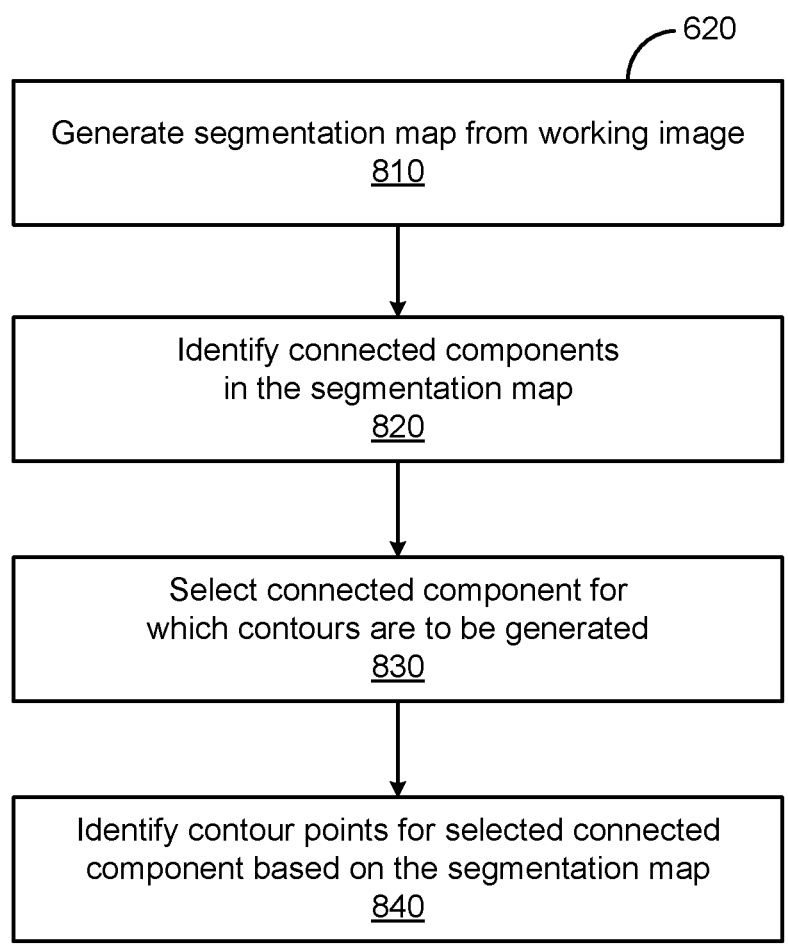
FIG. 8 is a flowchart illustrating an example method for generating contour points indicating the outline of a log stack in a working image, according to one embodiment.
Figure 9:
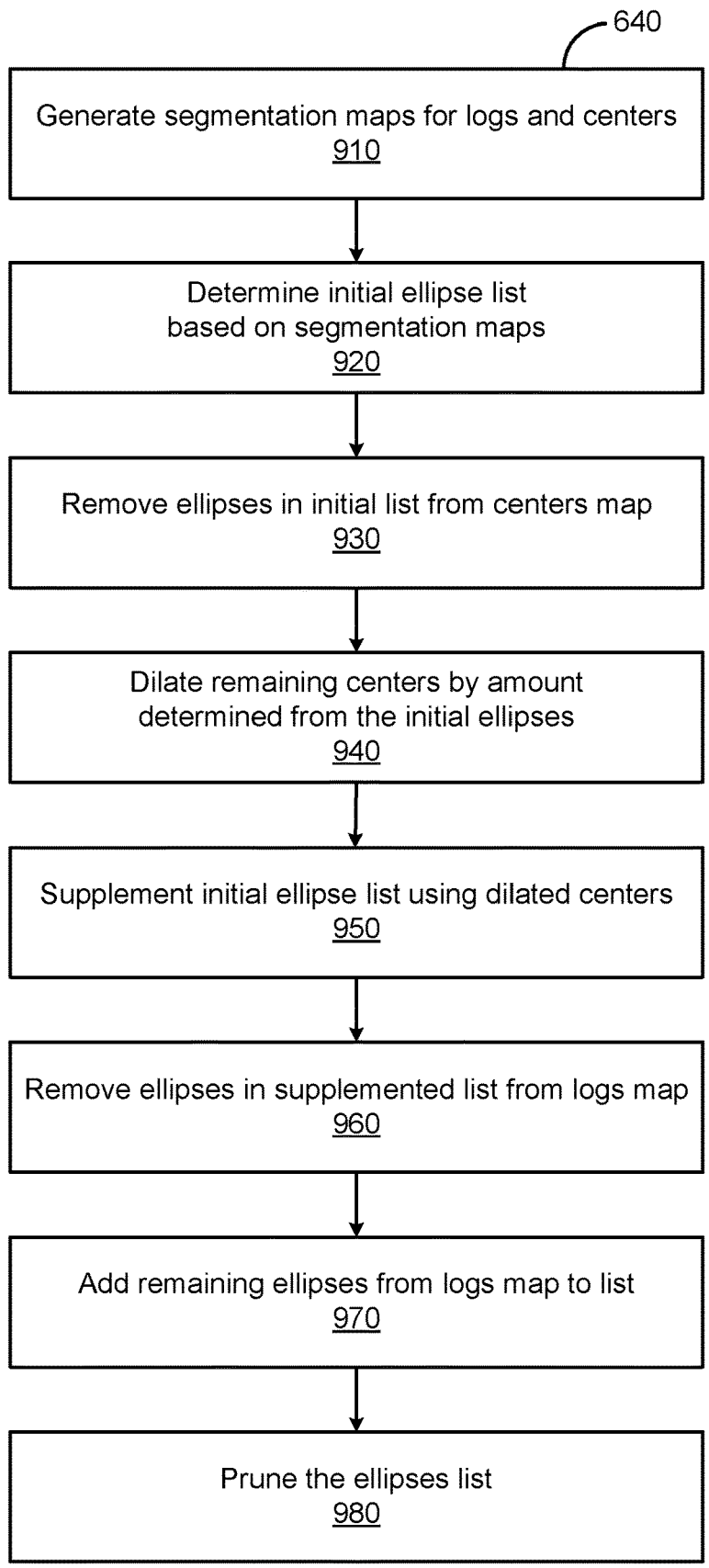
FIG. 9 is a flowchart illustrating an example method for identifying ellipses that correspond to logs in a working image, according to one embodiment.

FIG. 6 illustrates an example method 600 for detecting, counting, and measuring logs at a high level. In the embodiment shown, the method 600 begins with the handheld device 100 obtaining 610 a working image that includes a log stack. As described previously, the working image may be a single image or a panorama stitched together from multiple images by the image stitching subsystem 10. The contour detection subsystem 120 generates 620 a contour indicating the outline of the log stack in the working image. The log detection subsystem 130 crops 630 the image based on the contour and identifies 640 ellipses in the working image corresponding to log faces. The results generation subsystem 140 generates 650 output information based on the ellipses. FIGS. 7 through 9 illustrate example approaches for performing various steps of the method 600 in greater detail.

FIG. 7 illustrates an example approach for obtaining 610 a working image by stitching portions of a set of images. In the embodiment shown in FIG. 7, the image stitching subsystem 110 obtains 710 a set of images of the log stack. For example, a log counting application (app) executing on the handheld device 100 may prompt the user to capture a panorama and direct the user how to move the camera.

The image stitching subsystem 110 generates 720 log and center segmentation maps for each image in the set and resizes 730 the images based on the generated segmentation maps. For example, the image stitching subsystem 110 may resize 730 the image based on the height of the log stack and/or median diameter of the connected components in the log segmentation map, as described previously.

The image stitching subsystem 110 extracts features from the resized images (e.g., using a SURF detector) and matches features between consecutive images (e.g., using a RANSAC inlier algorithm). As described previously, if some of the images overlap by more than a threshold percentage, some images may be discarded to reduce the total amount of overlap. The images are transformed 760 based on the extracted features such that each image depicts the log stack from the same (or at least a substantially similar) perspective. The perspective being substantially similar means that the deviation between the planes of a given image and the central image is no more than a threshold angle. In various embodiments, the threshold angle ranges between two and five degrees.

The image stitching subsystem 110 identifies 770 stitch lines between adjacent images (e.g., the maximum energy paths through overlapping portions that do not cut through any log faces) and stitches 780 the images together along the stitch lines to create the working image.

FIG. 8 illustrates an example approach for generating 620 a contour indicating the outline of a log stack in a working image. In the embodiment shown in FIG. 8, the contour segmentation subsystem 120 generates 810 a segmentation map from the working image. As described previously, the segmentation map may be a binary segmentation map generated by a neural network that classifies each pixel in the working image as either wood or background.

The contour segmentation subsystem 120 identifies 820 the connected components in the segmentation map and selects 830 a connected component. For example, the largest connected component may be automatically selected and/or the user may be prompted to select between two or more options (e.g., if the images contains multiple connected components above a threshold size. The contour segmentation subsystem 120 identifies 840 a set of contour points surrounding the selected connected component. The contour points define the contour that indicates the outline of the log stack in the working image.

FIG. 9 illustrates an example approach for identifying 640 ellipses that correspond to logs in a working image. In the embodiment shown in FIG. 9, the log detection subsystem 130 generates logs and center segmentation maps from the working image. The log detection subsystem 130 determines 920 an initial ellipse list based on the segmentation maps. For example, as described previously, ellipses in the log map that meet specified criteria (e.g., including a single center from the center map, etc.) may be included in the initial ellipse list.

The log detection subsystem 130 removes 930 centers from the center map that correspond to ellipses included in the initial ellipse list. The remaining centers are dilated 940 by an amount determined from the initial ellipses. For example, the log detection subsystem 130 may determine the average major and minor axes dilation percentages that maps removed centers to the corresponding initial ellipses and dilate the remaining centers along their major and minor axes by the average percentages.

The log detection module 130 supplements 950 the initial ellipse list with the dilated centers and removes 960 the ellipses in the supplemented list from the log map. The log detection module 130 may add 970 remaining ellipses in the log map to the supplemented ellipse list. The ellipse list may also be pruned 980 (e.g., to remove ellipses with a total area below a minimum size threshold, a total area above a maximum size threshold, or a difference between major and minor axes greater than an aspect ratio threshold, etc.). The results generation subsystem 140 may use the supplemented and pruned ellipse list to generate results for presentation to the user, as described previously.

Example Machine Architecture

Figure 10:
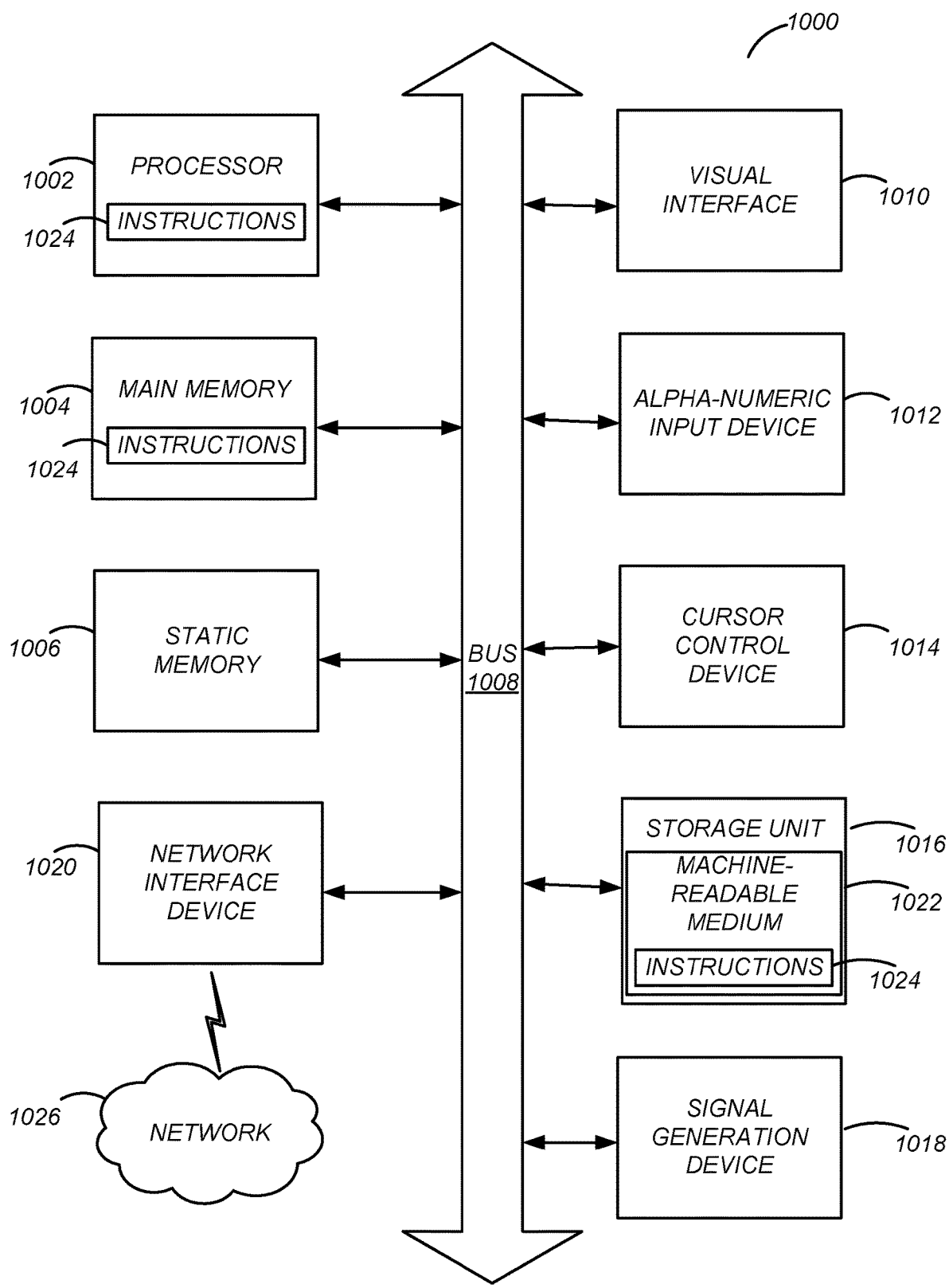
FIG. 10 is a block diagram illustrating components of an example machine able to read instructions from a machine-readable medium and execute them in a processor (or controller), according to one embodiment.

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of one or more instructions 1024 executable by one or more processors 1002. The program code may be configured to correspond to the function descriptions and processes of the modules and subsystems described above with reference to FIGS. 1 through 9. For convenience, operations are generally described herein as being performed by a processor 1002, but it should be understood that these operations may be distributed across any number of processors. Accordingly, any reference to "a processor" should be construed to include either a single processor or multiple processors performing the recited operations.

The machine may operate as a standalone device or may be connected (e.g., networked) to other machines. In a networked deployment, the machine may operate in the capacity of a server machine or a client machine in a server-client network environment, or as a peer machine in a peer-to-peer (or distributed) network environment. The machine may be a server computer, a client computer, a personal computer (PC), a tablet PC, a set-top box (STB), an internet of things (IoT) device, a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen. The computer system 1000 may also include alphanumeric input device 1012 (e.g., a camera, a keyboard or touch screen keyboard), a cursor control device 1014 (e.g., a mouse, trackball, joystick, motion sensor, touch screen, or other pointing instrument), a storage unit 1016, a signal generation device 1018 (e.g., a speaker), and a network interface device 1020, which are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system X00, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The apparatus, methods, and computer program products as disclosed provide benefits and advantages that include the ability to count the number of logs in a stack using images captured without requiring a highly-controlled capture environment. This may result in savings in time and money. For example, handheld devices are relatively inexpensive and readily available. Using a handheld (or at least readily mobile) device may also allow logs to be counted without spending time moving them to a counting machine and then to a storage location. Furthermore, the disclosed techniques may provide greater accuracy that existing approaches and/or reduce the amount of human intervention required. Thus, the apparatus, methods, and computer program products provide improvements in computer vision, inventory management systems, image analysis, and other areas.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 14. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1002, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces).

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically or semi-automatically counting logs in a stack through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A system to automatically detect, count, and measure logs, the system comprising:
a processor; and
a memory coupled to the processor, the memory comprising stored instructions that when executed by the processor cause the processor to:
receive a plurality of images of a stack of logs;
generate, for each image, a stack segmentation map indicating wood and background pixels, wherein the instructions that cause the processor to generate the segmentation stack map comprise instructions that cause the processor to:
split the image into a plurality of patches;
pass the plurality of patches as input to a stack segmentation neural network that outputs predictions of whether pixels correspond to wood or background; and
generate, based on the predictions, a segmented image having a first color corresponding to pixels predicted to correspond to wood and a second color corresponding to background pixels;
generate, for each image, a center segmentation map indicating locations of log centers in the image and a log segmentation map indicating regions of the image depicting log faces;
stitch portions of the images together based on logs and center segmentation maps to form a working image; and
analyze the working image to generate information regarding logs in the log stack.

2. The system of claim 1, wherein the instructions further cause the processor to:
determine at least one of stack height and median log dimensions for each image; and
resize at least some of the images based on the stack height or median log dimensions.

3. The system of claim 1, wherein the instructions that cause the processor to stitch portions of the images together comprise instructions that cause the processor to:
determine a final transform to apply to each image such that perspectives of the images match; and
stitch the images into the working image.

4. A system to automatically detect, count, and measure logs, the system comprising:
a processor; and
a memory coupled to the processor, the memory comprising stored instructions that when executed by the processor cause the processor to:
receive a plurality of images of a stack of logs;
generate, for each image, a stack segmentation map indicating wood and background pixels;
generate, for each image, a center segmentation map indicating locations of log centers in the image and a log segmentation map indicating regions of the image depicting log faces, wherein the instructions that cause the processor to generate the center segmentation map and the log segmentation map comprise instructions that cause the processor to:
split the image into a plurality of patches;
pass the plurality of patches as input to a logs and centers neural network that generates a log segmentation patch and a center segmentation patch for each patch, the log segmentation patch including pixels of a first color corresponding log faces and pixels of a second color corresponding to background, and the center segmentation map including pixels of the first color corresponding to log centers and pixels of the second color corresponding to background;

stitch the log segmentation patches together to form the log segmentation map for the image; and
stitch the center segmentation patches together to form the center segmentation map for the image;
stitch portions of the images together based on logs and center segmentation maps to form a working image; and
analyze the working image to generate information regarding logs in the log stack.

5. A system to automatically detect, count, and measure logs, the system comprising:
a processor; and
a memory coupled to the processor, the memory comprising stored instructions that when executed by the processor cause the processor to:
receive a plurality of images of a stack of logs;
compute a homographic transform for an image based on a comparison of the image with an adjacent image;
compute a rigid transform for the image based on the features of the image;
compose a combined transform from the rigid transform and the homographic transform using a dynamically determined composition factor;
apply the combined transform to the image;
generate, for each image, a stack segmentation map indicating wood and background pixels;
generate, for each image, a center segmentation map indicating locations of log centers in the image and a log segmentation map indicating regions of the image depicting log faces;
stitch portions of the images together based on logs and center segmentation maps to form a working image; and
analyze the working image to generate information regarding logs in the log stack.

6. The system of claim 5, wherein the comparison uses a feature matching algorithm with an inlier selection procedure.

7. The system of claim 5, wherein the instructions further cause the processor to:
discard one or more unnecessary images;
re-compute the homographic transform for the image responsive to the adjacent image being discarded as unnecessary;
re-compute a rigid transform for the image;
compute an affine transform for the image based on the log segmentation map;
compose a second combined transform from the recomputed rigid transform, the recomputed homographic transform, and the affine transform using a dynamically determined composition factor; and
apply the second combined transform to the image.

8. A system to automatically detect, count, and measure logs, the system comprising:
a processor; and
a memory coupled to the processor, the memory comprising stored instructions that when executed by the processor cause the processor to:
receive a plurality of images of a stack of logs;
generate, for each image, a stack segmentation map indicating wood and background pixels;
generate, for each image, a center segmentation map indicating locations of log centers in the image and a log segmentation map indicating regions of the image depicting log faces;
stitch portions of the images together based on logs and center segmentation maps to form a working image, wherein the instructions that cause the processor to stitch portions of the images together comprise instructions that cause the processor to:
apply a maximum-energy algorithm to the log segmentation maps to identify stitch lines in images that do not cut through log faces; and
stitch the images together along the stitch lines to form the working image; and
analyze the working image to generate information regarding logs in the log stack.

9. A system to automatically detect, count, and measure logs, the system comprising:
a processor; and
a memory coupled to the processor, the memory comprising stored instructions that when executed by the processor cause the processor to:
receive a plurality of images of a stack of logs;
determine an overlap percentage between a pair of images; and
discard one of the pair of images responsive to the overlap percentage exceeding a threshold;
generate, for each image, a stack segmentation map indicating wood and background pixels;
generate, for each image, a center segmentation map indicating locations of log centers in the image and a log segmentation map indicating regions of the image depicting log faces;
stitch portions of the images together based on logs and center segmentation maps to form a working image; and
analyze the working image to generate information regarding logs in the log stack.

10. A system to automatically detect, count and measure logs, the system comprising:
an image stitching subsystem comprising an image stitching subsystem processor and configured to generate a working image from one or more images, the working image including a log stack;
a contour detection subsystem comprising a contour detection subsystem processor and configured to:
detect, by the contour detection subsystem processor, the log stack in the working image; and
define, by the contour detection subsystem processor, a contour surrounding the log stack, wherein the contour detection subsystem being configured to detect the log stack in the working image comprises the contour detection subsystem being configured to:
resize, by the contour detection subsystem processor, the working image to a predefined maximum width and/or height;
generate, by the contour detection subsystem processor, a binarized segmented image including pixels corresponding to wood and pixels corresponding to background;
compute, by the contour detection subsystem processor, a list of connected components in the segmented image, the connected components being contiguous groups of pixels that correspond to wood;
select, by the contour detection subsystem processor, a connected component from the list;
determine, by the contour detection subsystem processor, a list of contour points to surround the selected connected component; and select, by the contour detection subsystem processor, contour points that indicate local minimum and maximum values;

a log detection subsystem comprising a log detection subsystem processor and configured to:
crop, by the log detection subsystem processor, the working image based on the contour; and
fit, by the log detection subsystem processor, ellipses to the working image corresponding to portions of the working image that depict log faces; and a results generation subsystem comprising a results generation subsystem processor and configured to:
generate, by the results generation subsystem processor, results for display based on the fitted ellipses.

11. The system of claim 10, wherein the working image is a panoramic image generated by stitching together portions of a plurality of images.

12. The system of claim 10, wherein the contour detection subsystem being configured to generate, by the contour detection subsystem processor, the segmented image comprises the contour detection subsystem being configured to:
split, by the contour detection subsystem processor, the resized image into a plurality of patches;
pass, by the contour detection subsystem processor, the patches as input to a neural network that generates segmented output patches, the segmented output patches including probabilities that pixels correspond to wood or background;
stitch, by the contour detection subsystem processor, the segmented output patches into the segmented image; and
binarize, by the contour detection subsystem processor, the segmented image based on a threshold.

13. The system of claim 10, wherein the contour detection subsystem being configured to select, by the contour detection subsystem processor, the connected component comprises the contour detection subsystem being configured to select, by the contour detection subsystem processor, a largest connected component from the list of connected components.

14. The system of claim 10, wherein two or more of the image stitching subsystem processor, the contour detection subsystem processor, the log detection subsystem processor, and the results generation subsystem processor are the same processor.

15. A system to automatically detect, count and measure logs, the system comprising:
an image stitching subsystem comprising an image stitching subsystem processor and configured to generate a working image from one or more images, the working image including a log stack;
a contour detection subsystem comprising a contour detection subsystem processor and configured to:
detect, by the contour detection subsystem processor, the log stack in the working image; and
define, by the contour detection subsystem processor, a contour surrounding the log stack;
a log detection subsystem comprising a log detection subsystem processor and configured to:
crop, by the log detection subsystem processor, the working image based on the contour; and
fit, by the log detection subsystem processor, ellipses to the working image corresponding to portions of the working image that depict log faces, wherein the log detection subsystem being configured to fit ellipses to the working images comprises the log detection subsystem being configured to:

resize, by the log detection subsystem processor, the cropped working image to a predefined maximum width and height;
split, by the log detection subsystem processor, the resized working image into a plurality of patches;
pass, by the log detection subsystem processor, the patches as input to a neural network that outputs a plurality of 2-channel output patches corresponding to the input patches, wherein a first channel indicates pixels corresponding to log faces the second channel indicates pixels corresponding to log centers;
stitch, by the log detection subsystem processor, the plurality of output patches into a segmentation map including a log map and a center map; and
generate, by the log detection subsystem processor, a list of ellipses based on the log map and the center map; and a results generation subsystem comprising a results generation subsystem processor and configured to:
generate, by the results generation subsystem processor, results for display based on the fitted ellipses.

16. The system of claim 15, wherein the log map and the center map are binarized segmentation maps.

17. The system of claim 15, wherein the log detection subsystem being configured to generate, by the log detection subsystem processor, the list of ellipses comprises the log detection subsystem being configured to:
locate, by the log detection subsystem processor, centers in the center map by identifying connected components;
fit, by the log detection subsystem processor, ellipses over the connected components;
compute, by the log detection subsystem processor, a list of initial ellipses from ellipses in the log map that meet specified criteria;
compute, by the log detection subsystem processor, a major and minor dilation percentage between each ellipse in the initial list and a corresponding center in the center map;
remove, by the log detection subsystem processor, centers corresponding to ellipses in the initial list from the center map;
dilate, by the log detection subsystem processor, remaining centers in the center map using the major and minor dilation percentages;
add, by the log detection subsystem processor, the dilated centers to the initial ellipse list to produce an enriched ellipse list;
remove, by the log detection subsystem processor, ellipses corresponding to the dilated centers from the log map; and
add, by the log detection subsystem processor, remaining ellipses in the log map to the enriched ellipse list.

18. The system of claim 17, wherein the specified criteria include, for a given ellipse, one or more of:
the given ellipse in the log map encompasses only one point in the center map;
the point in the center map encompassed by the given ellipse is positioned close to the geometric center of the given ellipse;
an area of the given ellipse is larger than 10% of a median connected component area in log map; and
a ratio between the major and minor axes of the ellipse is between 0.3 and 3.

19. The system of claim 17, wherein the log detection subsystem being configured to generate, by the log detection subsystem processor, the list of ellipses further comprises the log detection subsystem being configured to prune, by the log detection subsystem processor, the enriched ellipse list based one or more of ellipse area and overlap percentage.

20. The system of claim 15, wherein two or more of the image stitching subsystem processor, the contour detection subsystem processor, the log detection subsystem processor, and the results generation subsystem processor are the same processor.

* * * * *